Patented Mar. 29, 1932

1,851,130

UNITED STATES PATENT OFFICE

KENNETH V. B. ROSSMAN, OF TRENTON, NEW JERSEY, ASSIGNOR TO FEDERATED METALS CORPORATION, OF NEW YORK, N. Y., A CORPORATION OF DELAWARE

PROCESS OF TREATING ZINC SKIMMINGS

No Drawing. Application filed January 29, 1929. Serial No. 336,022.

This invention relates to a process for treating zinc skimmings or the like to eliminate compounds of chlorine and other impurities therefrom.

"Zinc skimmings" comprise a by-product from galvanizing processes and other processes where metallic zinc is heated, melted and/or volatilized. Generally the most important impurity in zinc skimmings is zinc chloride arising from the use of certain fluxing substances comprising chlorides. That is, in the various processes of utilizing zinc, these chloride flux materials combine with the zinc and contribute the impurity of zinc chloride to the zinc skimmings.

Zinc skimmings as commercially available embody as an average in the neighborhood of 75% zinc. As much as 5% of the zinc may be in the form of zinc chloride, in the neighborhood of 15% may be present as metallic zinc, and the balance is generally largely zinc oxide. Small amounts of impurities in the form of chlorides or oxides of iron, tin, copper, aluminum and nickel are also often present.

In order that the zinc from such skimmings may be recovered and successfully used either in zinc smelting or as a source of zinc in the manufacture of zinc by-products, such as lithopone, the zinc chloride and other chlorides must be substantially eliminated.

It is therefore an object of this invention to provide a relatively inexpensive process for substantially eliminating impurities such as chlorides from zinc skimmings and permitting the recovery of a high percentage of the zinc.

The invention consists in the process and steps of the process which are herein described according to a preferred manner of practicing the same and the invention will be more particularly pointed out in the appended claim.

Heretofore in order to eliminate the chlorine from zinc skimmings, down to a very low percentage, the general practice has been to crush and grind the material in a suitable machine such as a ball mill, and to screen the metallic zinc that will not pass through an 8 mesh screen, from the ground skimmings. The screened skimmings are then heated in a rotary kiln and as the material passes through the kiln, the chlorine is eliminated and passes out through settling chambers to a stack and thence to the air.

With such processes carried out in the ordinary form of rotary kilns, the recovery of zinc is comparatively low for various reasons, important among which are the following. A considerable portion of the metallic zinc of the material must necessarily become so quickly raised in temperature that it will be volatilized and carried out of the kiln. Also, particles of zinc will be carried out to the stack with the waste gases. With such a process, the rotary kiln presents the further disadvantage that the skimmings remain in constant contact with the gases of combustion from the burner.

I have discovered that the above disadvantages may be eliminated with the consequent recovery of higher percentages of zinc of good quality by the following process, which is preferably carried out in a multiple hearth furnace of the general type which is illustrated, for example, in the patent to Baird, 1,669,925 of May 15, 1928, although it will be understood that other types of multiple hearth furnaces of the same general class may be used. A furnace for example having nine hearths including a top drying or heating hearth may be used. The zinc skimmings may first be crushed and ground, and screened substantially according to the customary practice above referred to. The screened skimmings are then gradually fed into the furnace, and are slowly rabbled over the succeeding hearths down through the furnace.

In order that the process may be carried out to best advantage, I find it to be very important to carefully control the temperatures within the furnace substantially as follows. The temperature maintained at the top hearth should be in the neighborhood of 100° C. and the temperatures on the succeeding lower hearths respectively should be increased by substantially uniform amounts so that the temperature maintained at the bottom of the furnace is in the neighborhood of 750° C. By keeping the temperatures within these limits, and thus gradually raising the temperature of the material from hearth to hearth, the metallic zinc thereof becomes largely oxidized, thus precluding volatilization. The zinc losses incurred in the older process above referred to are thus substantially eliminated.

The process may be carried out continuously and a limited amount of air is admitted to the furnace; generally sufficient air will be admitted through the cracks around the furnace doors and at the burner.

With the temperatures above indicated, the chlorides of the material will be gradually volatilized and will pass out through the upper part of the furnace.

When the process is carried out in this type of multiple hearth furnace, the flow of gases may be so regulated and limited as to substantially eliminate stack losses of the desired zinc.

After a preliminary grinding and screening of the product to be treated whereby as high as from 15% to 20% of metallic zinc may be removed from the product, the resulting skimmings containing say in the neighborhood of 70% of zinc in the form of oxides and chlorides are treated by the process above described. According to the processes formerly used the usual maximum recovery of roasted zinc skimmings, that is zinc oxide with minor impurities, amounted to from 79% to 81% of the screened mixture, whereas with the process above described from 85% to 87% of the zinc screenings may be recovered as zinc oxide; the theoretical maximum being in the neighborhood of 90%. The only impurities remaining will be in the form of iron, lead or cadmium oxides and other minor ingredients embodied in the original skimmings which contribute no undesirable characteristics to the product.

What I claim as new and desire to secure by Letters Patent is:

Process of substantially eliminating chlorides from zinc skimmings, which comprises introducing same into a multiple hearth furnace, rabbling the zinc skimmings over the several hearths successively while applying gradually increasing temperatures thereto and with the admission of a limited amount of air, the temperature on the upper hearths being insufficient to cause any substantial oxidation of the metallic zinc and the gradually increased temperatures on the succeeding hearths being sufficient to substantially completely eliminate chlorides from the skimmings, and whereby the remaining zinc is oxidized substantially without volatilization.

In testimony whereof I have signed my name to this specification.

KENNETH V. B. ROSSMAN.